(12) United States Patent
Rahn

(10) Patent No.: US 6,238,129 B1
(45) Date of Patent: May 29, 2001

(54) MOUNTING ADAPTER FOR INSTRUMENT HOLDER

(76) Inventor: Peter R. Rahn, 1460A S. 77th St., West Allis, WI (US) 53214

( * ) Notice: Subject to any disclaimer, the term of this patent is extended or adjusted under 35 U.S.C. 154(b) by 0 days.

(21) Appl. No.: 09/350,549

(22) Filed: Jul. 9, 1999

(51) Int. Cl.7 ................................................ B25G 3/04
(52) U.S. Cl. .................... 403/301; 403/306; 403/345; 403/299; 403/286; 248/441.1; 248/454.121
(58) Field of Search .................................. 403/301, 303, 403/305, 306, 345, 365, 299, 286; 248/441.1, 454, 121

(56) References Cited

U.S. PATENT DOCUMENTS

| | | | |
|---|---|---|---|
| 936,281 | * 10/1909 | Woolsey | 248/458 |
| 2,103,703 | 12/1937 | Van Kooten . | |
| 3,183,025 | * 5/1965 | Lynch, Jr. et al. | 403/390 |
| 3,527,486 | * 9/1970 | Gamp | 403/298 X |
| 3,742,870 | * 7/1973 | Gusdorf et al. | 248/415 X |
| 3,784,316 | * 1/1974 | Bittern | 408/204 |
| 3,837,759 | * 9/1974 | Bittern | 403/259 X |
| 3,999,878 | * 12/1976 | Robinson | 403/407 |
| 4,482,119 | 11/1984 | Zelkowitz et al. . | |
| 5,015,117 | * 5/1991 | Pawlicki | 403/300 |
| 5,028,048 | * 7/1991 | Watson et al. | 248/441.1 X |
| 5,314,427 | * 5/1994 | Goble et al. | 411/457 X |
| 5,456,440 | * 10/1995 | Sideris | 248/458 |
| 5,540,159 | 7/1996 | Anderson . | |
| 5,655,865 | * 8/1997 | Plank et al. | 403/405.1 X |
| 5,771,650 | * 6/1998 | Williams et al. | 403/292 X |
| 6,126,355 | * 10/2000 | Clover, Jr. | 403/373 X |

* cited by examiner

Primary Examiner—Lynne H. Browne
Assistant Examiner—Ernesto Garcia
(74) Attorney, Agent, or Firm—Andrus, Sceales, Starke & Sawall, LLP

(57) ABSTRACT

A portable instrument holder for smaller instruments such as harmonicas is adapted for use with commonly available stands, such as microphone stands. This adapter is comprised of an adapter block that releasably engages an instrument holder. The adapter block fits onto the threaded upper end of the stand that is adjustable in height. The adapter block has a selection of threaded holes to fit various stand thread-types and stand diameters.

4 Claims, 3 Drawing Sheets

MOUNTING ADAPTER FOR INSTRUMENT HOLDER

BACKGROUND AND SUMMARY OF THE INVENTION

This invention relates generally to music stands, and in particular to an adapter to transform microphone stands into stands for instruments.

Although some musicians use only a single instrument during a performance, others may use a plurality of instruments during a single musical score. For instance, a harmonica player may use only a single harmonica, whereas others may need as many as fifteen or more harmonicas available for any given performance. The harmonicas should be organized by key, and must be readily available to allow the musician to quickly switch back and forth between two or more instruments.

Typically, musicians travel from stage to stage to give performances, and the stages vary in size and the availability of music stands, microphone stands, tables, etc. Thus, a musician never knows where he or she may easily arrange a grouping of instruments so that they are readily accessible. For musicians who like to travel lightly, this may present a problem because it is cumbersome to bring a large stand or folding table that may or may not fit on the stage, and may interfere with the musicians space during performance.

Accordingly, it is one object of the present invention to utilize microphone stands, which are readily available at almost every site, as an adjustable support stand for a portable instrument holder. It is another object of the present invention to include a separate adapter block for the instrument holder that can engage the threads of stands commonly found in the United States or abroad (e.g. English or metric-threads). It is yet another object of the invention to engage the instrument holder with the stand so that it is quickly releasable without upsetting any instruments placed thereon.

In accordance with the present invention, there is provided an instrument holder that engages a tubular support having an upper threaded end. The tubular support may consist of a microphone stand with the microphone holder removed so that the threaded end is exposed. Such stands are quite common, and typically occupy stages and theaters where musicians perform. The adapter is comprised generally of an adapter block and an instrument holder. The instrument holder has a front surface configured to hold an array of instruments, such as harmonicas. On the rear surface, one may find either a projection or a sleeve for engaging a projection. The projection or sleeve engages an adapter block having at least one threaded hole for engaging the stand, and either a corresponding projection or sleeve for engaging the instrument holder to the adapter block. Thus, two combinations are possible: (a) the instrument holder has a projection for engaging the adapter block having a sleeve, or (b) the instrument holder has a sleeve for engaging an adapter block having a projection.

In one aspect of the invention, the instrument holder is comprised of a material such as wood wherein it is practical to include a separate mounting block embedded in the rear surface thereof to receive the sleeves.

In another aspect of the invention, there is more than one threaded hole in the adapter block for accommodating different types of screw threads. For example, a first threaded hole may accommodate a first type screw-thread for stands commonly found in the United States, and a second threaded hole may have a second type screw-thread for accommodating stands typically found abroad. Rather than having separate holes, a threaded adapter may be used instead. The threaded adapter is comprised of a tube that has an external thread for engaging one type of screw-threads, and an internal screw-thread for engaging a second type of screw-threads. Thus, one could remove the threaded adapter to accommodate tubular supports with a large-diameter, threaded upper end, and use the threaded adapter for tubular supports having a small-diameter, threaded upper end. The threaded adapter includes a slot for allowing the threaded adapter to be turned by a tool for insertion or removal from the threaded hole.

The adapter of claim 1 further includes a lip located on a front lower edge of the holder so that it may also serve to hold sheet music.

DETAILED DESCRIPTION OF THE PREFERRED EMBODIMENT

Figure 1:
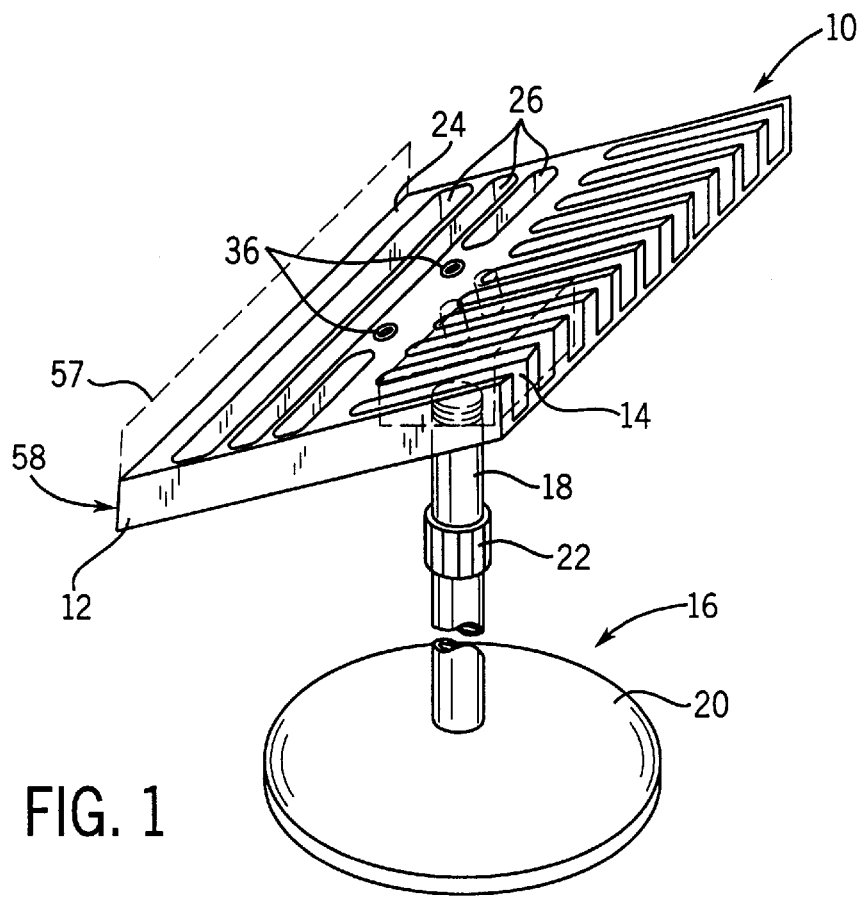
FIG. 1 is an isometric view of an adapter and stand of the present invention shown in its assembled condition.

Referring initially to FIG. 1, a conventional mounting adapter 10 of the present invention typically includes an instrument holder 12 and an adapter block 14 (shown in phantom). The adapter block 14 is threadedly engaged to a stand 16. Stand 16 is of the type readily found at theaters and stages where musicians typically perform.

Stand 16 is generally comprised of an adjustable tubular support having a threaded upper end, and a base 20. Tubular support 18 is comprised of two telescoping members and a collar 22. When collar 22 is loosened, tubular support 18 may be adjusted in height. Tubular support 18 is then locked into a desired height by tightening collar 22.

The top surface 24 of instrument holder 12 contains a variety of recesses or slots 26 useful for holding certain instruments such as harmonicas. The slots 26 may be configured in a variety of sizes and shapes to accommodate different types of instruments or different arrangements thereof. Instrument holder 12 is comprised of a material that has the characteristics of being either moldable or machinable, rigid enough to hold and store a variety of small instruments, and capable of withstanding the rigors of travel from stage to stage. Preferably, instrument holder 12 is either wood or molded plastic.

Figure 2:
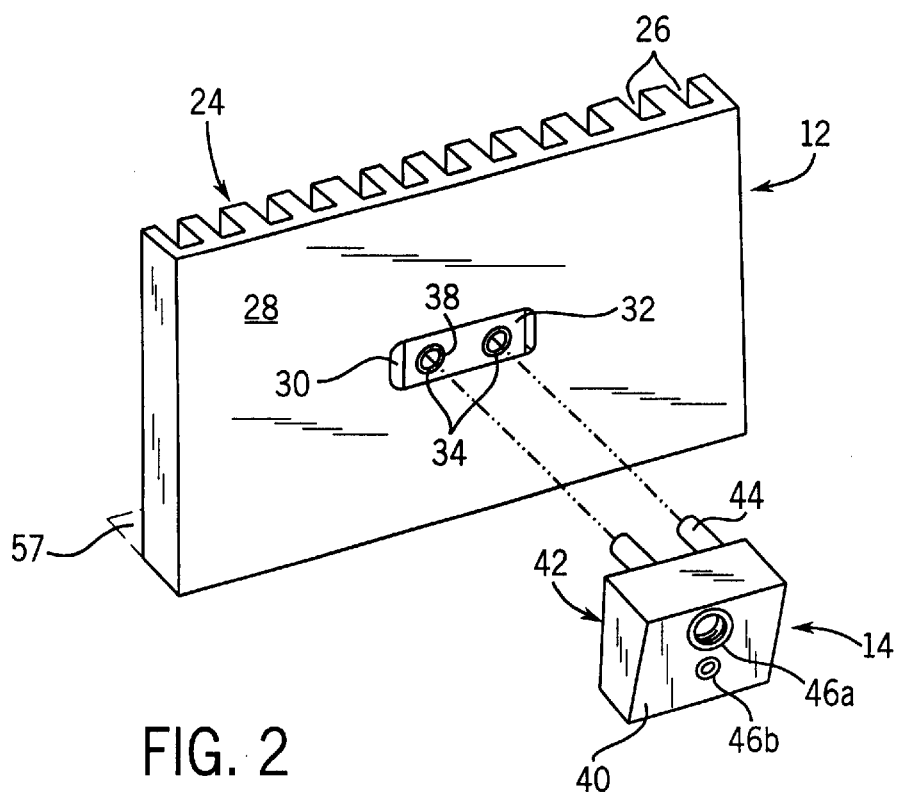
FIG. 2 is an isometric view of the instrument holder having a mounting block embedded in its rear surface for receiving the adapter block projections.

Referring also to FIG. 2, the instrument holder 12 has a rear surface 28 wherein an additional recess 30 is formed. Recess 30 accommodates a mounting block 32 that is flushly embedded therein, and held in place with fasteners 36 (shown in FIG. 1). It is preferable that mounting block 32 is flushly embedded or even slightly recessed within the instrument holder 12 so that the rear surface 28 may rest stably upon a tabletop. Mounting block 32 accommodates at least one sleeve 34. Sleeve 34 is preferably made of a durable, non-corrosive metal and is slip fit into a bore defined by a cylindrical surface 38, as shown in FIG. 2. Sleeves 34 are held into place with an adhesive, such as LOCTITE.

Referring still to FIG. 2, adapter block 14 is a four-sided polyhedron having opposite sides which are parallel with the exception of the first surface 40 containing a threaded hole and the opposite second surface 42 containing projections 44 as shown. Adapter block 14 is preferably made of polypropylene because it is easily machined and durable enough to withstand the intended use of the invention. At the first surface 40, two holes are bored into adapter block 14 normal to the surface 40. These holes are tapped to accommodate different screw-threads and stand diameters corresponding generally to microphone stands found either in the United States (US std.) or in Europe (metric). One skilled in the art will realize that a variety of tapped holes 46a, 46b and 46c may be provided to correspond to standard threads found on various stands or the like. Further, it is possible to line the hole with a metal sleeve (not shown) that is tapped to accommodate the threaded stands. This may provide a higher degree of durability over long term use.

Projections 44 extend normally with respect to second surface 42 of adapter block 14. Projections 44 are comprised of two circular metal pins that are press fit into holes bored into adapter block 14, and held into place with an adhesive such as LOCTITE. One skilled in the art will realize that other pin arrangements may be used. For instance, a single pin having a square or oval cross-section could be used. The advantage of a square pin would be that it would not rotate, yet it would allow one to place instrument holder 12 into different positions relative to the adapter block 14. The advantage of the single oval shaped pin is that instrument holder 12 would be mounted onto the adapter block 14 only one way, and rotation is prevented due to its shape. It is preferable that pins 44 are composed of a polished, non-corrosive metal having chamfered edges for easy alignment with corresponding sleeves 34. However, one skilled in the art will understand that pins 44 may be made of plastic or the like.

Alternatively, both instrument holder 12 and adapter block 14 could be made of molded materials, eliminating the need for sleeves 34, mounting block 32, or separate pins 44 mounted within adapter block 14. In yet another alternative method of manufacturing, instrument holder 12 could be machined from a material such as polypropylene, eliminating the need for mounting block 32, yet one may still wish to use sleeves 34 for added durability, and to provide a low friction bearing-type fit with pins 44.

In yet another embodiment of the present invention, projections 44 are located on the rear surface 28 of instrument holder 12 and the corresponding sleeves 34 are located on the surface 42 of adapter block 14. This configuration may be less desirable because projections 44 extending from the rear surface 28 of instrument holder 12 would prevent the instrument holder 12 from sitting flat on a tabletop, or from easily fitting into a slim briefcase or the like.

Figure 3:
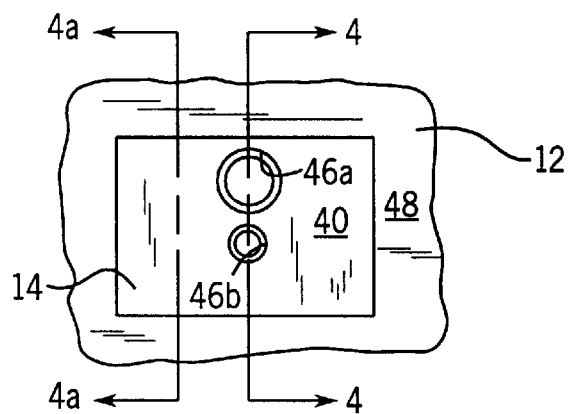
FIG. 3 is an enlarged bottom plan view of the adapter block shown in FIG. 2.
Figure 4:
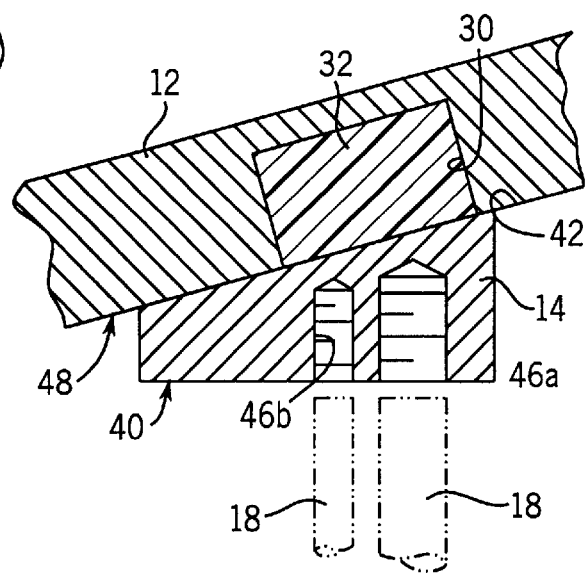
FIG. 4 is a partial cross-section taken along line 4—4 of FIG. 3.
Figure 4A:
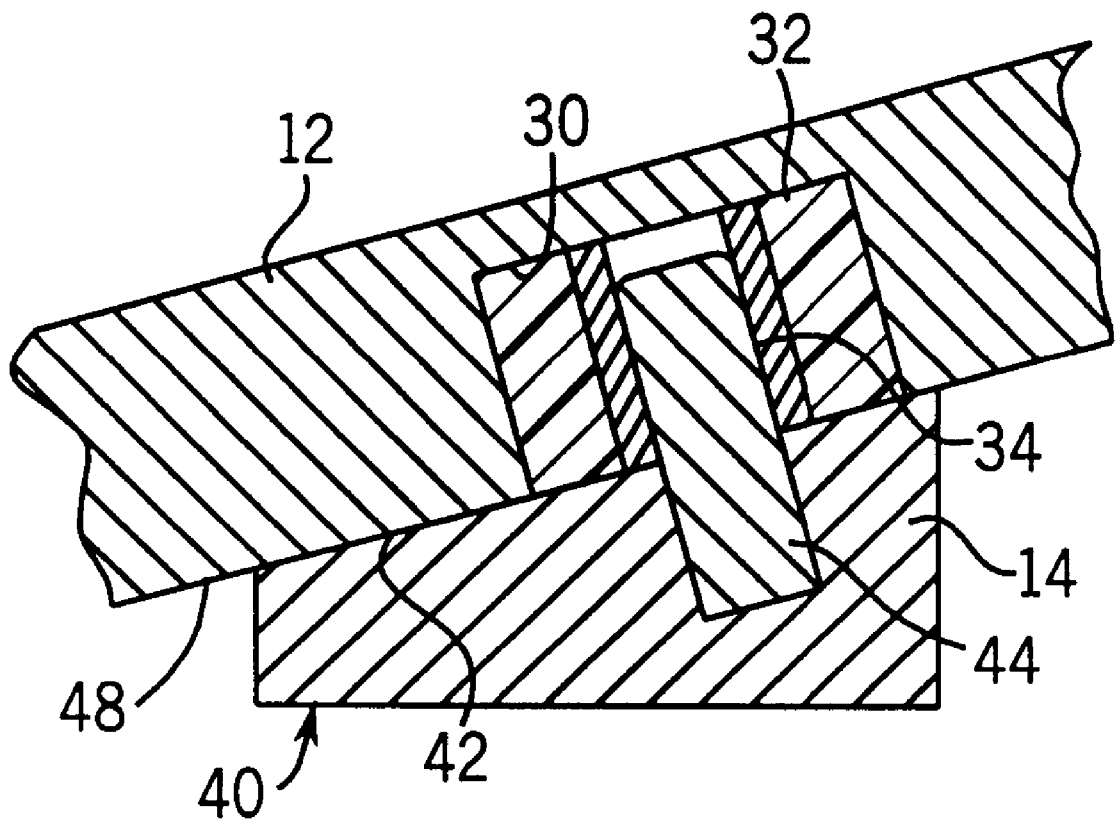
FIG. 4a is a partial cross-section taken along line 4a—4a in FIG. 3.

Referring now to FIGS. 3, 4 and 4a, adapter block is shown as it is engaged with instrument holder 12. FIG. 3 portrays a partial bottom plan view of adapter block 14 engaged with instrument holder 12. Visible are two holes at surface 40 of adapter block 14, namely first threaded hole 46a and second threaded hole 46b. Threaded holes 46a and 46b are of different diameters and/or thread types to accommodate tubular supports having differing threaded upper ends. One should note that in the embodiment shown, instrument holder 12 does not include a mounting block 32.

FIG. 4 portrays a side view of the adapter as shown in FIG. 3 along section 4—4. From this view, one can see that threaded holes 46a and 46b are defined by threaded cylindrical surfaces. The threaded cylindrical surfaces are created by first boring holes into adapter block 14 and tapping the holes. FIG. 4 also demonstrates how stand 18 fits into relationship to either threaded hole 46a or 46b, and how the surface 48 of instrument holder 12 and surface 42 of adapter block 14 nest firmly against each other. Likewise, FIG. 4a demonstrates how instrument holder 12 is engaged with adapter block 14 using projections 44 such as a pair of steel pins. Projections or pins 44 engage sleeve 34 with a slip fit so that it can be easily removed, but prevents movement or wobble when engaged.

Figure 5:
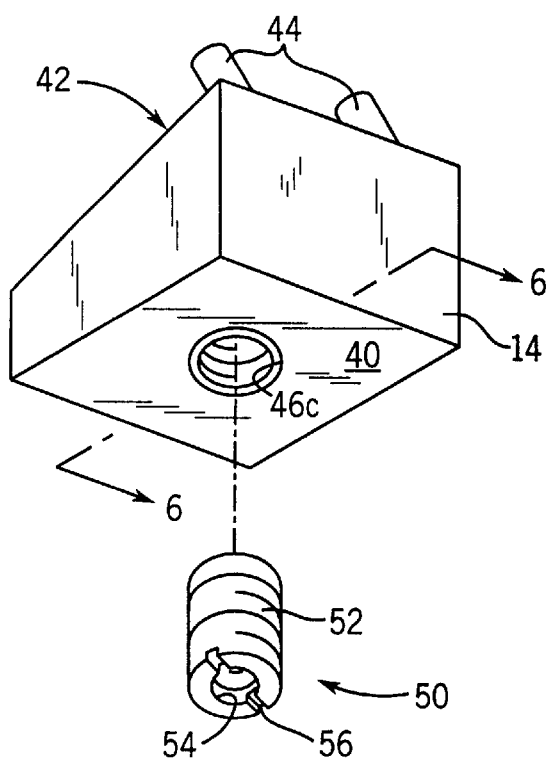
FIG. 5 is an isometric view of the threaded adapter and the adapter block.
Figure 6:
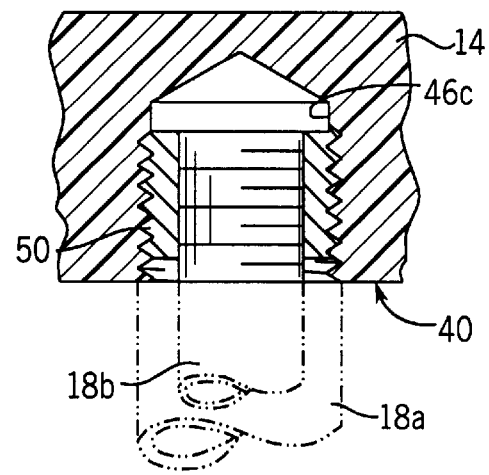
FIG. 6 is an enlarged cross-sectional view of the adapter block having the threaded adapter engaged therein, taken along line 6—6 in FIG. 5.

FIGS. 5 and 6 show alternative means for engaging various stands having different diameters and thread types. Rather than having a variety of separate threaded holes to accommodate the different stands, there is instead one threaded hole 46c that is used in conjunction with threaded adapter 50. Threaded adapter 50 is constructed generally of a steel tube having a series of threads 52 on its outer cylindrical surface, and a series of threads 54 defining an inner cylindrical surface. Outer threads 52 are matched to the threaded hole 46c of adapter block 14. Thus, threaded adapter 50 can be flushly engaged within the threaded hole 46c as depicted in FIG. 6. Slot 56 is provided at one end of threaded adapter 50 so one may turn threaded adapter 50 into hole 46c using a tool such as a screwdriver or the like. Therefore, one can either use adapter block 14 without threaded adapter 50 to accommodate a larger diameter stand 18a (as shown in FIG. 6), or may use threaded adapter 50 to accommodate a smaller diameter stand 18b.

The present invention is generally used with standard equipment that exists at the locations where musicians perform. For instance, microphone stands are commonly available. Microphone stands have a detachable top that, when removed, exposes a threaded upper end of the tubular support. One merely needs to engage adapter block 14 and tubular support 18 with one of the threaded holes provided, such as 46a or 46b, or with threaded adapter 50. When adapter block is engaged with tubular support 18, its lower surface 40 will be generally horizontal with respect to the floor. Surface 42 of adapter block 14 generally slants toward the musician. Instrument holder 12 is then aligned over adapter block 14 so that sleeves 34 are aligned with pins 44. Once adapter block 14 is engaged with instrument holder 12, a stable platform is provided for the holding of instruments. Alternatively, one can provide a lip 57 (shown in phantom in FIGS. 1 and 2) at lower edge 58 of instrument holder 12 so that one can rest sheet music on the surface thereof. Further, it is contemplated that one could provide a hinged or removable lid over the upper surface of instrument holder 12 so that instruments could be stored therein. One would merely need to remove the lid after placing instrument holder 12 onto adapter block 14.

Various modes of carrying out the present invention are contemplated as being within the scope of the following claims, particularly pointing out and distinctly claiming the subject matter which is regarded as the invention.

I claim:

1. A mounting adapter for attaching an instrument holder to a stand of the type having a tubular support with a threaded upper end, said adapter comprising:

an adapter block having at least one threaded hole at a first surface adapted for attachment to the threaded upper end of the tubular support, and at least two pins projecting from an opposite second surface; and a mounting block adapted to be retained within said instrument holder, said mounting block having a front surface and a rear surface, wherein said rear surface has at least two sleeves positioned to slidably receive each pin on the adapter block.

2. The adapter of claim 1 wherein said at least one threaded hole comprises a first threaded hole having a first type screw-thread for engaging a first-type stand, and a second threaded hole disposed adjacent the first hole having a second type screw-thread for engaging a second-type stand.

3. A mounting adapter for a stand of the type having a tubular support with a threaded upper end, said adapter comprising:

an adapter block including one of either a projection and a sleeve, which the projection is slidably-inserted mounted on an upper surface of said adapter block;

a mounting block adapted to be mounted to the instrument holder, said mounting block including the other of said projection and said sleeve mounted on a lower surface of said mounting block; and a threaded connector disposed on a lower surface of the adapter block and extending partially through the adapter block that is adapted to receive the threaded upper end of the tubular support.

4. The adapter of claim 3 wherein the threaded connector comprises at least one threaded hole at a surface of the adapter block opposite the sleeve or the projection.

* * * * *